(12) United States Patent
Worsley et al.

(10) Patent No.: US 9,460,865 B2
(45) Date of Patent: *Oct. 4, 2016

(54) MECHANICALLY ROBUST, ELECTRICALLY CONDUCTIVE ULTRALOW-DENSITY CARBON NANOTUBE-BASED AEROGELS

(71) Applicant: LAWRENCE LIVERMORE NATIONAL SECURITY, LLC, Livermore, CA (US)

(72) Inventors: Marcus A. Worsley, Hayward, CA (US); Theodore F. Baumann, Discovery Bay, CA (US); Joe H. Satcher, Jr., Patterson, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,801

(22) Filed: May 12, 2016

(65) Prior Publication Data

US 2016/0260550 A1   Sep. 8, 2016

Related U.S. Application Data

(60) Continuation of application No. 14/179,271, filed on Feb. 12, 2014, now Pat. No. 9,384,870, which is a division of application No. 12/652,616, filed on Jan. 5, 2010, now Pat. No. 8,685,287.

(60) Provisional application No. 61/147,694, filed on Jan. 27, 2009.

(51) Int. Cl.
*H01B 1/06* (2006.01)
*H01B 1/24* (2006.01)
(Continued)

(52) U.S. Cl.
CPC .............. *H01G 11/56* (2013.01); *H01G 11/26* (2013.01); *H01G 11/36* (2013.01); *H01G 11/38* (2013.01);
(Continued)

(58) Field of Classification Search
USPC ......... 252/500, 502, 510; 977/742, 752, 932
See application file for complete search history.

(56) References Cited

U.S. PATENT DOCUMENTS 5,260,855 A   11/1993 Kaschmitter et al.
5,409,683 A    4/1995 Tillotson et al.
(Continued)

FOREIGN PATENT DOCUMENTS

WO   WO-2008/000163 A1   1/2008

OTHER PUBLICATIONS

Bordjiba, T. et al. (2008) "New Class of Carbon-Nanotube Aerogel Electrodes for Electrochemical Power Sources," Adv. Mater. 20:815-819.
(Continued)

*Primary Examiner* — Bijan Ahvazi
(74) *Attorney, Agent, or Firm* — Foley & Lardner LLP (57) ABSTRACT

Disclosed here is a device comprising a porous carbon aerogel or composite thereof as an energy storage material, catalyst support, sensor or adsorbent, wherein the porous carbon aerogel comprises a network of interconnected struts comprising carbon nanotube bundles covalently crosslinked by graphitic carbon nanoparticles, wherein the carbon nanotubes account for 5 to 95 wt. % of the aerogel and the graphitic carbon nanoparticles account for 5 to 95 wt. % of the aerogel, and wherein the aerogel has an electrical conductivity of at least 10 S/m and is capable of withstanding strains of more than 10% before fracture.

20 Claims, 10 Drawing Sheets

(51) Int. Cl.
| | |
|---|---|
| H01G 11/56 | (2013.01) |
| H01M 4/583 | (2010.01) |
| H01G 11/36 | (2013.01) |
| H01G 11/26 | (2013.01) |
| H01G 11/38 | (2013.01) |
| H01B 1/00 | (2006.01) |
| H01B 1/12 | (2006.01) |
| B82Y 30/00 | (2011.01) |
| B82Y 15/00 | (2011.01) |

(52) U.S. Cl.
CPC .............. *H01M 4/583* (2013.01); *B82Y 15/00* (2013.01); *B82Y 30/00* (2013.01); *Y10S 977/75* (2013.01); *Y10S 977/752* (2013.01); *Y10S 977/948* (2013.01); *Y10S 977/953* (2013.01); *Y10S 977/962* (2013.01)

(56) References Cited

U.S. PATENT DOCUMENTS

| | | | |
|---|---|---|---|
| 5,601,938 | A | 2/1997 | Mayer et al. |
| 6,500,401 | B2 | 12/2002 | Reznek et al. |
| 6,653,356 | B2 | 11/2003 | Sherman |
| 6,809,060 | B2 | 10/2004 | Suh et al. |
| 6,843,919 | B2 | 1/2005 | Klabunde et al. |
| 6,906,003 | B2 | 6/2005 | Struthers et al. |
| 6,986,818 | B2 | 1/2006 | Tillotson et al. |
| 7,005,401 | B2 | 2/2006 | Lu et al. |
| 7,074,880 | B2 | 7/2006 | Rhine et al. |
| 7,256,147 | B2 | 8/2007 | Yamada et al. |
| 7,270,851 | B2 | 9/2007 | Sullivan |
| 7,282,466 | B2 | 10/2007 | Long et al. |
| 7,378,450 | B2 | 5/2008 | Erkey et al. |
| 7,410,718 | B2 | 8/2008 | Cooper et al. |
| 7,442,747 | B1 | 10/2008 | Long et al. |
| 7,780,875 | B2 | 8/2010 | Asgari |
| 8,172,964 | B2 | 5/2012 | Gash et al. |
| 8,629,076 | B2 | 1/2014 | Worsley et al. |
| 8,685,287 | B2 | 4/2014 | Worsley et al. |
| 2002/0094426 | A1 | 7/2002 | Stepanian et al. |
| 2004/0176643 | A1 | 9/2004 | Sato et al. |
| 2006/0293434 | A1 | 12/2006 | Yodh et al. |
| 2007/0292732 | A1 | 12/2007 | Feaver et al. |
| 2009/0123358 | A1 | 5/2009 | Costa et al. |
| 2009/0185327 | A1 | 7/2009 | Seymour |
| 2009/0229032 | A1 | 9/2009 | Stepanian et al. |
| 2009/0317619 | A1 | 12/2009 | Di Monte et al. |
| 2010/0028634 | A1 | 2/2010 | Turevskaya et al. |
| 2010/0139823 | A1 | 6/2010 | Gash et al. |
| 2010/0190639 | A1 | 7/2010 | Worsley et al. |
| 2012/0122652 | A1 | 5/2012 | Worsley et al. |

OTHER PUBLICATIONS

Bryning, M.B. et al. (2007) "Carbon Nanotube Aerogels," Advanced Materials 19:661-664.

Hwang, S-W. et al. (2007) "Synthesis and characterization of tin oxide/carbon aerogel composite electrodes for electrochemical supercapacitors," Journal of Power Sources 172:451-459.

Kucheyev, S.O. et al. (2009) "Depth-sensing indentation of low-density brittle nanoporous solids," Acta Materialia 57:3472-3480.

Maldonado-Hodar, F.J. et al. (2000) "Metal-carbon aerogels as catalysts and catalyst supports," Studies in Surface Science and Catalysis 130:1007-1012.

Moreno-Castilla, C. et al. (1999) "Group 6 metal oxide-carbon aerogels. Their synthesis, characterization and catalytic activity in the skeletal isomerization of 1-butene," Applied Catalysis A: General 183:345-356.

Pekala, R.W. et al. (1998) "Carbon aerogels for electrochemical applications," Journal of Non-Crystalline Solids 225:74-80.

Petricevic, R. et al. (2001) "Planar fibre reinforced carbon aerogels for application in PEM fuel cells," Carbon 39:857-867.

Poole, C.P. et al. (2003) "Carbon Nanostructures," Introduction to Nanotechnology:103-132.

Worsley, M.A. et al. (2009) "Properties of single-walled carbon nanotube-based aerogels as a function of nanotube loading," Acta Materialia 57:5131-5136.

Worsley, M.A. et al. (2009) "Mechanically robust and electrically conductive carbon nanotube foams," Applied Physics Letters 94:073115-1-073115-3.

Worsley, M.A. et al. (2009) "Stiff and electrically conductive composites of carbon nanotube aerogels and polymers," J. Mater. Chem. 19:3370-3372.

Worsley, M.A. et al. (2008) "Synthesis and Characterization of Carbon Aerogel Nanocomposites Containing Double-walled Carbon Nanotubes," ACS Philadelphia, PA, United States, Aug. 17, 2008 through Aug. 21, 2008, LLNL-CONF-402282.

Worsley, M.A. et al. (2008) "Synthesis and Characterization of Monolithic Carbon Aerogel Nanocomposites Containing Double-Walled Carbon Nanotubes," Langmuir 24:9763-9766.

Zhu, J. et al. (2013) "Fast hydrogen generation from $NaBH_4$ hydrolysis catalyzed by carbon aerogels supported cobalt nanoparticles," International Journal of Hydrogen Energy 38(25):10864-10870.

FIG. 1A
4 wt % SWNT

FIG. 1B
20 wt % SWNT

FIG. 1C
30 wt % SWNT

FIG. 1D
55 wt % SWNT

MECHANICALLY ROBUST, ELECTRICALLY CONDUCTIVE ULTRALOW-DENSITY CARBON NANOTUBE-BASED AEROGELS

CROSS-REFERENCE TO RELATED APPLICATIONS

The present application is a continuation of U.S. application Ser. No. 14/179,271 filed Feb. 12, 2014, which is a divisional of U.S. application Ser. No. 12/652,616 filed Jan. 5, 2010, which claims benefit under 35 U.S.C. §119(e) of U.S. Provisional Patent Application No. 61/147,694 filed Jan. 27, 2009 entitled "mechanically robust, electrically conductive ultralow-density carbon nanotube-based aerogels," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to aerogels and more particularly to mechanically robust, electrically conductive ultralow-density carbon nanotube-based aerogels.

2. State of Technology

Carbon Aerogels (CAs) are novel mesoporous materials with applications such as electrode materials for super capacitors and rechargeable batteries, adsorbents and advanced catalyst supports. Carbon nanotubes (CNTs) possess a number of intrinsic properties. CNTs have large aspect ratios (100-1000).

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of making a mechanically robust, electrically conductive ultralow-density carbon nanotube-based aerogel, including the steps of dispersing nanotubes in an aqueous media or other media to form a suspension, adding reactants and catalyst to the suspension to create a reaction mixture, curing the reaction mixture to form a wet gel, drying the wet gel to produce a dry gel, and pyrolyzing the dry gel to produce the mechanically robust, electrically conductive ultralow-density carbon nanotube-based aerogel. The present invention provides a porous carbon material comprising 5 to 95% by weight carbon nanotubes and 5 to 95% carbon binder. In one embodiment the present invention provides a porous carbon material comprising 5 to 95% by weight carbon nanotubes and 5 to 95% organic binder porous organic material that is pyrolyzed. Aerogels constructed according to the present invention have many uses. For example, aerogels constructed according to the present invention have use as electrode materials for super capacitors and rechargeable batteries, adsorbents and advanced catalyst supports.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

DEFINITION OF TERMS

Various terms used in this patent application are defined below.

CA=Carbon Aerogel
CAT=Carbon Nanotubes

CA-CNT=Carbon Aerogel & Carbon Nanotube Composite
SWNT=Single-Walled Carbon Nanotubes
DWNT=Double-Walled Carbon Nanotubes
SDBS=Sodium Dodecylbenzene Sulfonate
MESOPORPOUS=Pore Dia. 2 & 5 mm
PVA=Polyvinyl Alcohol
CVD=Chemical Vapor Deposition
TEM=Transmission Electron Microscopy
SEM=Scanning Electron Microscopy
R/C=Resorcinol to Catalyst Ratios
RF=Resorcinol and Formaldehyde Solids
BET=Brunauer-Emmett-Teller
Mechanically Robust=Can withstand strains greater than 10% before fracture
Electrically Conductive=Exhibits an electrical conductivity of 10 S/m or greater
Ultralow-Density=Exhibits densities less than 50 mg/cc
Carbon Nanotube-Based Aerogel=Porous carbon material consisting of 5 to 95% carbon nanotubes by weight The present invention provides a method of making a mechanically robust, electrically conductive ultralow-density carbon nanotube-based aerogel, The method includes the steps of dispersing nanotubes in an aqueous media or other media to form a suspension, adding reactants and catalyst to the suspension to create a reaction mixture, curing the reaction mixture to form a wet gel, drying the wet gel to produce a dry gel, and pyrolyzing the dry gel to produce the mechanically robust, electrically conductive ultralow-density carbon nanotube-based aerogel. The present invention also provides an aerogel that includes a porous carbon material comprising 5 to 95% by weight carbon nanotubes and 5 to 95% carbon binder.

Applicants have developed a method to fabricate mechanically robust, electrically conductive low-density carbon nanofoams with macroscopic dimensions. The nanofoams are prepared by the sol-gel polymerization of resorcinol with formaldehyde in an aqueous suspension containing a dispersion of highly purified single-walled carbon nanotubes. Subsequent drying and pyrolysis result in nanoporous solids consisting of a random network of carbon nanotube bundles decorated and crosslinked by graphitic carbon nanoparticles. Such nanotube-based foams exhibit electrical conductivities and elastic properties significantly improved compared to those of foams without nanotubes and elastic behavior up to compressive strains as large as ~v80%. They are the stiffest low-density nanoporous solids reported and could find use in many energy-related applications.

Applicants determined that double-walled CNTs can be incorporated into a carbon aerogel matrix at concentrations up to ~8 wt % by starting with surfactant-stabilized nanotube dispersions. The resultant composites display isotropic properties with enhanced electrical conductivities and elastic moduli compared to those of carbon aerogels without CNTs.

Applicants demonstrate how carbon aerogel nanoparticles can serve to crosslink CNTs resulting in a new class of ultralow-density nanoporous monoliths of macroscopic dimensions with unprecedented properties. Compared to Applicants' previous attempts of foam synthesis based on surfactant-stabilized dispersions of double-walled CNTs, Applicants use purified single-walled CNTs dispersed directly in water without the aid of surfactants. The resultant foam consists of a random network of single-walled CNT bundles decorated and crosslinked by graphitic nanoparticles. We demonstrate nanofoams with CNT concentrations over 60 wt % and monolith densities as low as ~10 mg cm$^{-3}$. These nanoporous solids simultaneously exhibit remarkable mechanical stiffness, very large elastic strains, and high electrical conductivity even at densities approaching ~10 mg cm$^{-3}$. The foams are stable at temperatures over 1000° C. and have shown to be unaltered by exposure to extremely low temperatures (~15 K) during immersion into cryogenic hydrogen. Hence, in addition to use in applications such as catalyst supports, sensors, adsorbents, and energy storage, these ultralight, robust nanofoams could be used as scaffolds for novel composites. As a conductive network is already established, it could be impregnated through the wicking process with a matrix of choice, ranging from molten metals to polymer melts to ceramic pastes to cryogenic deuterium-tritium liquids and crystals.

Examples

Sample Preparation

A DWNT-CA composite was prepared using traditional organic sol-gel chemistry. Purified DWNTs (Carbon Nanotechnologies, Inc.) were suspended in an aqueous surfactant solution containing SDBS and thoroughly dispersed using a Bronwill Biosonik IV tip sonicator operating at 25% of maximum power at high frequency. To determine the optimal conditions for DWNT dispersion, a range of sonication times (1 to 4 hrs) and SDBS-to-DWNT ratios (10:1, 5:1 and 2.5:1) were evaluated. Once the DWNT were dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol to catalyst ratio (R/C) employed for the synthesis of the composites was ~200. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical CO2 and pyrolyzed at 1050° C. under a N2 atmosphere for 3 h. The composite materials were isolated as black cylindrical monoliths. Carbon aerogel composites with DWNT loadings ranging from 0 to 8 wt % (0 to 1.3 vol %) were prepared by this method. For comparison purposes, pristine CAs as well as SDBS-loaded CAs were also prepared using the method described above, except without the addition of the DWNT.

Characterization.

Bulk densities of the DWNT-CA composites were determined from the physical dimensions and mass of each sample. The volume percent of DWNT in each sample was calculated from the initial mass of DWNTs added, assuming a CNT density of 1.3 g/cm3, and the final volume of the aerogel. Scanning electron microscopy (SEM) characterization was performed on a JEOL 7401-F. SEM sample preparation included sputtering a few nanometer layer of Au on the aerogel sample. Imaging was done at 5-10 keV (20 mA) in SEI mode with a working distance of 2-8 mm. Electrical conductivity was measured using the four-probe method similar to previous studies. Metal electrodes were attached to the ends of the cylindrical samples. The amount of current transmitted through the sample during measurement was 100 mA and the voltage drop along the sample was measured over distances of 3 to 6 mm.

Materials.

All reagents were used without further purification. Resorcinol (99%) and formaldehyde (37% in water) were purchased from Aldrich Chemical Co. Sodium carbonate (anhydrous) was purchased from J.T. Baker Chemical Co. Sodium dodecylbenzene sulfonate (SDBS) was purchased from Fluka Chemical Corp., Inc. Purified DWNTs were purchased from Carbon Nanotechnologies, Inc.

Results.

Based on our initial results, we found that tip sonication of DWNTs in aqueous solution of sodium dodecyl benzene sulfonate (SDBS) provided the most uniform dispersion of DWNTs in the CA matrix and, therefore, this approach was used to prepare the nanocomposites. In a typical synthesis, the DWNT were added to a solution of SDBS in water and dispersed using a tip sonicator. Resorcinol, formaldehyde and the reaction catalyst were then added to the solution and the reaction mixture was cured at elevated temperatures, during which time, black monolithic gels formed. These wet gels were then supercritically-dried and carbonized to afford the DWNT-CA composites. Interestingly, during the solvent exchange step prior to supercritical drying, the fluid washed from the pores of the wet gel was clear, indicating that the majority of DWNTs had been incorporated into the aerogel structure. Using this approach, a series of CA composites with DWNT loading ranging from 0 to 8 wt % (0 to 1.3 vol %) were prepared.

The microstructures of the DWNT-CA composites were evaluated using scanning electron microscopy. As shown in FIGS. 1A-1D, the network structures of the CAs consist of interconnected networks of primary carbon particles, as would be expected based on the sol-gel reaction formulation. This observation is important as it shows that the formation of the aerogel network is not negatively impacted by the presence of either the surfactant or the DWNTs. These images also show the distribution of DWNTs throughout the CA framework. Clearly, the combination of SDBS surfactant and sonication was effective in maintaining the dispersion of DWNT during the sol-gel polymerization reaction. Based on the SEM images, the DWNTs are dispersed as bundles with diameters of less than 10 nanometers, while the lengths of these bundles are on the order of ~1 micron. Not surprisingly, the composites prepared with higher loading levels of DWNTs clearly show a higher population of nanotubes in the SEM images.

Figure 1A:
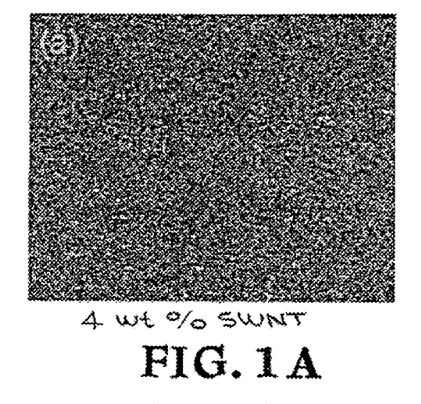
FIGS. 1A-1D are SEM images of nanotube-based aerogels with (A) 4 wt %, (B) 20 wt %, (C) 30 wt %, and (D) 55 wt % CNTs.
Figure 1B:
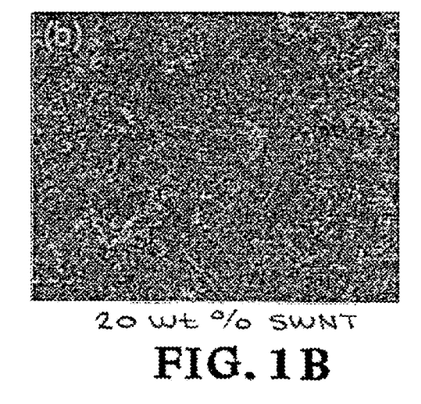

FIGS. 1A and 1B show SEM images revealing that nanofoams with CNT loading below - - - 20 wt % have the morphology of pristine carbon aerogels (i.e., conventional carbon aerogels without nanotubes), consisting of a randomly interconnected network of carbon nanoparticles. Hence, the process of gelation is not negatively impacted by the presence of <20 wt % of CNTs in the matrix. FIGS. 1A and 1B also show the uniform distribution of nanotubes throughout the aerogel framework, demonstrating that the acid fimetionalization of CNTs during purification and sonication were effective in maintaining the dispersion of CNTs during the sol-gel polymerization reaction. Nanotubes are dispersed as randomly-oriented bundles with diameters of <10 nm and lengths of ~500-1000 nm.

Figure 1C:
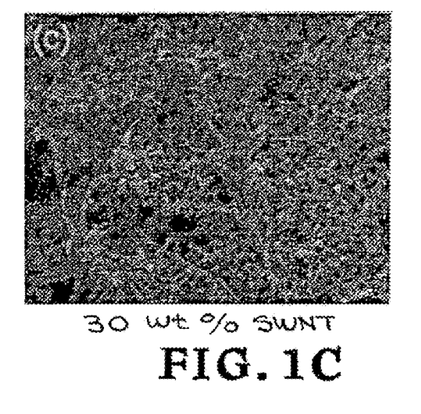
Figure 1D:
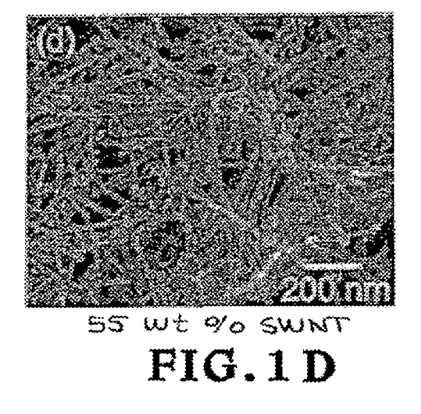

FIGS. 1C and 1D show that, for nanotube loading >20 wt %, the foam morphology changes from a network of interconnected nanoparticles (typical of pristine carbon aerogels) to a network of randomly interconnected filament-like struts. The diameters of these filaments range from <5 nm to almost 40 nm. Transmission electron microscopy images (FIG. 2) further show that, at least at the surface, these structures do not appear to be purely CNTs or their bundles as no nanotube walls are visible.

Figure 2A:
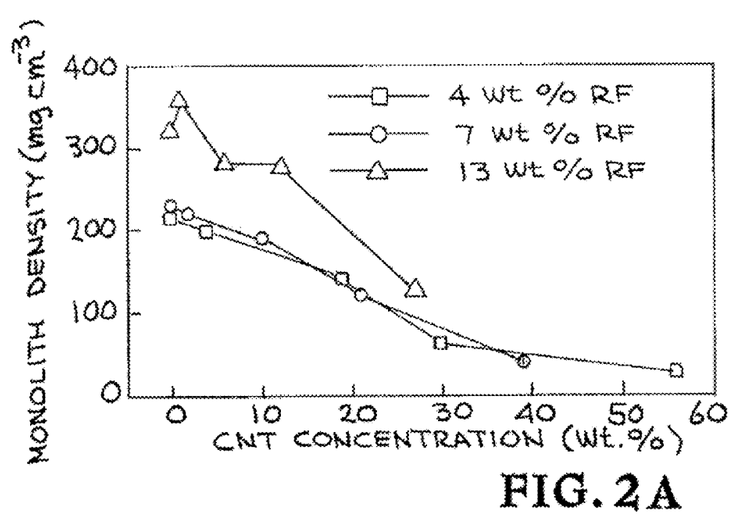
FIGS. 2A and 2B show plots of (FIG. 2A) monolith density and CNT concentration and (2B) volume shrinkage as a function of CNT loading.
Figure 2B:
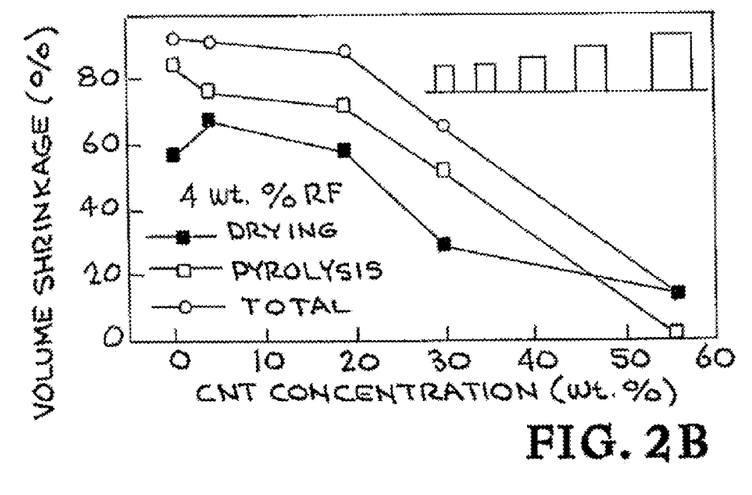

FIGS. 2A and 2B are two plots. FIG. 2A is a plot showing monolith density and CNT concentration. FIG. 2B is a plot showing volume shrinkage as a function of CNT loading. To determine the effect that incorporation of DWNTs into the CA matrix has on the electrical properties of these materials, the electrical conductivity of the DWNT-CA composites were determined using the four-point probe method. As shown in FIGS. 2A and 2B, the electrical conductivity of each composite material is enhanced relative to their respective pristine CA reference. The electrical conductivity enhancement, ° enhanced, is given by $$\sigma_{enhanced} = \frac{\sigma_{DWNT-CA} - \sigma_{CA}}{\sigma_{CA}} \quad \text{[Equation 1]}$$

where σDWNT-CA and σCA are the measured electrical conductivities of the DWNT-CA composite and the pristine CA, respectively. This relative enhancement in electrical conductivity was chosen over absolute electrical conductivity so that samples of different densities could be directly compared. In general, the electrical conductivity of the nanocomposites increases as a function of DWNT concentration.

The observation of filament-like struts in FIGS. 1C, 1D, and 2 indicates that, for CNT loading above ~20%, the majority of nucleation during the sol-gel reaction occurred on nanotube walls instead of in the sol. This is consistent with previous observations of nucleation on the walls of 10-micron-diameter carbon fibers introduced into a sol-gel reaction.

Figure 3:
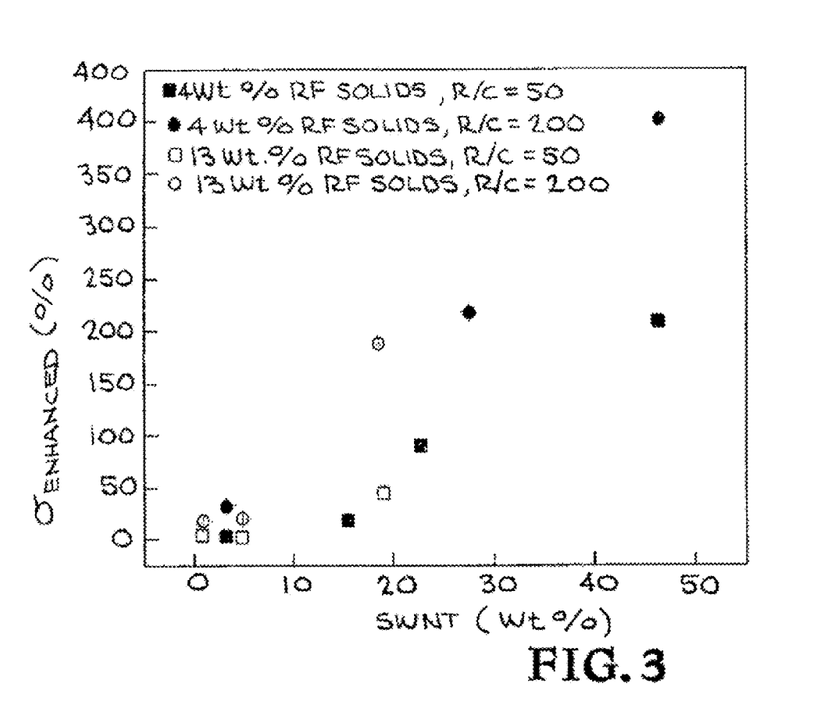
FIG. 3 shows plots of the nanotube loading dependencies of the monolith density for foams.

FIG. 3 shows plots of the nanotube loading dependencies of the monolith density for foams prepared with different concentrations of resorcinol and formaldehyde (RF) solid content in the starting solution and volume shrinkage for 4 wt % RF solid content for a resorcinol to catalyst (R/C) ratio of 50. The monoliths prepared with a R/C of 200 showed similar trends. FIG. 3a reveals that the monolith density decreases with increasing CNT loading for all RF solid contents. Formulations that would typically yield pristine carbon aerogels with densities of - - - 200-350 mg cm$^{-3}$, with addition of CNTs to the reaction mixture, can achieve densities of ~30-150 mg cm$^{-3}$. Such a decrease in the monolith density is related to smaller volume shrinkage (FIG. 3) during both supercritical drying and pyrolysis. This dramatic effect of nanotube loading on monolith shrinkage is clearly illustrated in the inset of FIG. 3b, showing a series of samples gelled in molds of the same size but shrunk to various degrees during drying and pyrolysis depending on nanotube loading.

Figure 4:
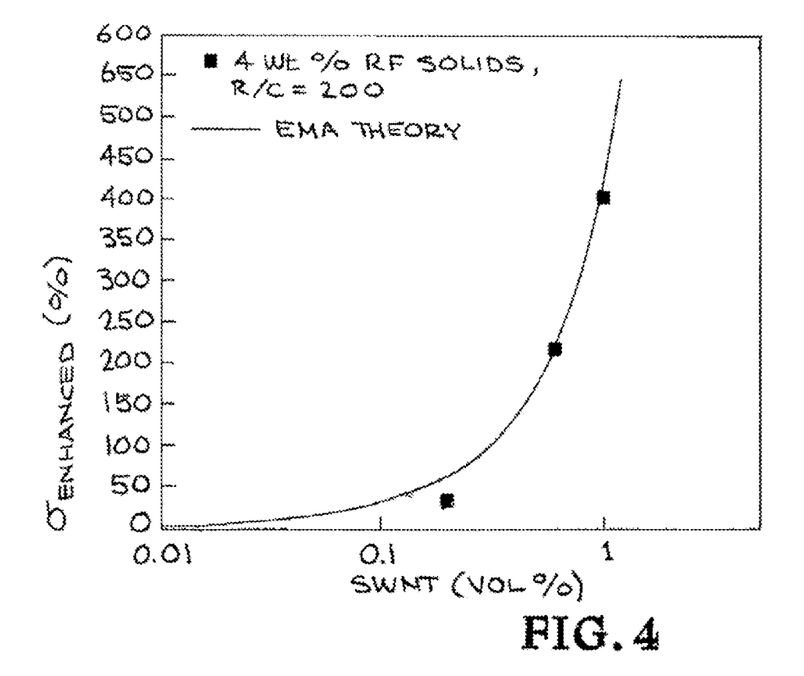
FIG. 4 illustrates the dependence of Young's modulus on the monolith density for carbon aerogels.

FIG. 4 illustrates the dependence of Young's modulus on the monolith density for carbon aerogels with different nanotube loading and R/C ratios of 50 (closed symbols) and 200 (open symbols). Data from previous studies of carbon, silica, and alumina aerogels, are also shown for comparison. The inset shows a sequence of uniaxial compression of a monolith with a density of 30 mg cm$^{-3}$ and a CNT loading of 55 wt %, illustrating a "superelastic" behavior with complete strain recovery after compression to strains as large as ~76'/0.

The reduced shrinkage of CNT-based aerogels could be attributed to their improved mechanical properties with increasing CNT loading. FIG. 4 shows a double logarithmic plot of the dependence of Young's modulus on the monolith density for nanofoams with different CNT loading. It is seen from FIG. 4 that moduli for pristine aerogels correlate well with data reported by Pekala et al., (21) with aerogels prepared using a smaller R/C ratio of 50 being stiffer than those prepared with a larger R/C ratio. It is also seen from FIG. 4 that the elastic modulus E exhibits a power-law dependence on the material density, with an exponent in of −2,5. All points for carbon aerogels roughly fall on two lines, which are extrapolations of the dependencies for pristine aerogels prepared with R/C ratios of 50 and 200. Nanofoams with CNT loading of <16 wt % show no significant improvement of the elastic modulus over that for pristine carbon aerogels, while moduli of all foams with CNT loading >16 wt % fall on the same line, independent of loading values and the R/C ratio. This observation is in agreement with the dramatic change in foam morphology, reduced shrinkage, and improved electrical conductivity (see below) for foams with large CNT loading.

Figure 5:
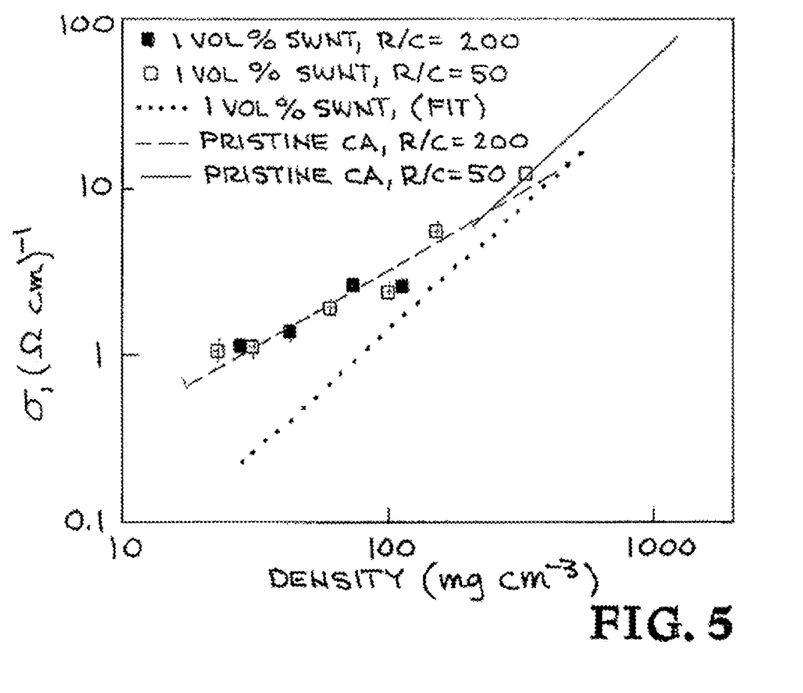
FIG. 5 compares elastic properties of CNT-loaded nanofoams with those of some other low-density nanoporous systems.
Figure 6A:
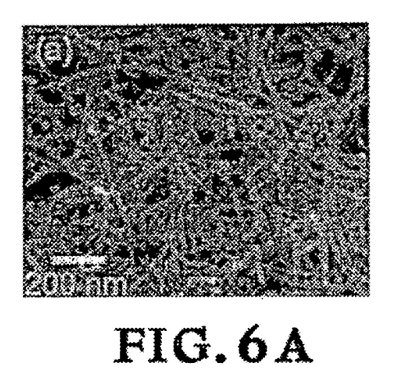
FIGS. 6A-6D shows SEM images of the composites.
Figure 6B:
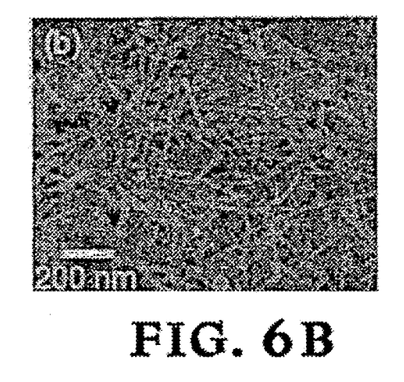
Figure 6C:
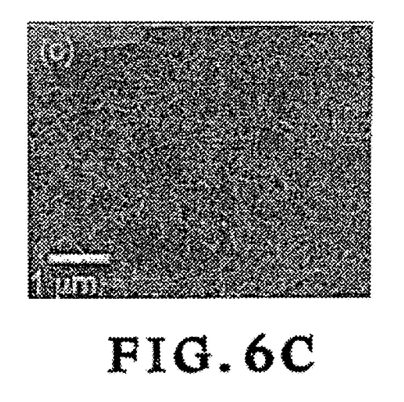
Figure 6D:
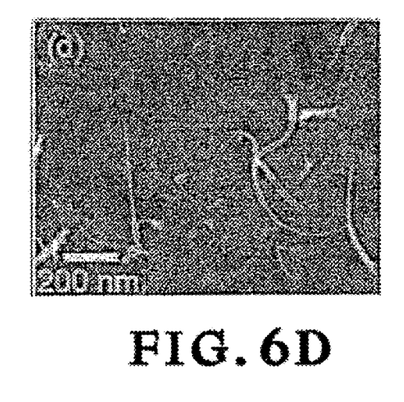

FIG. 5 also compares elastic properties of CNT-loaded nanofoams with those of some other low-density nanoporous systems, such as conventional carbon, silica, and alumina aerogels previously reported in the literature. It illustrates unprecedented mechanical properties of nanotube-based foams. Indeed, for a given density, the nanotube-based aerogels are the stiffest. For example, for a density of 100 mg cm$^{-3}$, foams with CNT loading above 16 wt. % are ~12 and ~3 times stiffer than conventional silica and carbon aerogels, respectively. Nanotube-based foams are also ~3 times stiffer than the "superstiff" alumina nanofoams whose struts have the morphology of curled nanoleaflets. FIG. 4 shows a sequence of images taken of an 30 mg cm$^{-3}$ aerogel with a CNT loading of 55 wt % before, during, and after uniaxial loading up to a maximum strain of −76%. It shows a "superelastic" behavior with complete strain recovery that we have observed for nanotube-based foams with densities below ~50 mg cm$^{-3}$.

FIG. 5 illustrates the dependence of electrical conductivity of nanotube-based aerogels on the monolith density. Data are for foams prepared with R/C ratios of 50 (closed symbols) and 200 (open symbols) and with nanotube loading of 0 and 30 wt %. The inset shows a dramatic increase in the effective conductivity of foam struts (defined in the text) with increasing nanotube loading above ~16 wt %.

FIG. 5 shows the dependence of electrical conductivity, u, of nanotube-based aerogels on the monolith density, p, for a set of aerogels prepared with R/C ratios of 50 and 200 and with nanotube loading of 0 and 30 wt %. Such a double-logarithmic plot reveals a power-law nature of the u(p) dependence: o p", with an exponent n of −1.55 for both sets of foams with different CNT loading and independent of the R/C ratio. Previous observations for pristine aerogels by Lu et al. are consistent with results of FIG. 5.

Although the exponent n is independent of CNT loading, FIG. 5 clearly shows that, the electrical conductivity is ~3 times larger for aerogels with 30 wt % CNTs than for pristine aerogels of the same density, indicating that the effective conductivity of aerogel struts, increases with increasing CNT loading. This effect is better illustrated in the inset in FIG. 5, showing that cs. dramatically increases for CNT loading above ~16%, independent of the R/C ratio. Hence, conductivity data are consistent with behavior of monolith shrinkage, elastic properties, and changes to foam morphology discussed above. For a CNT loading of - - - 60 wt %, an ~5 time increase in conductivity is observed. The close-to-linear dependence of the effective conductivity of foam struts on CNT loading revealed by the inset in FIG. 5 is expected for struts made of nanotube bundles decorated and interconnected with graphitic carbon nanoparticles (FIG. 1). In this case, strut conductivity is dominated by the resistivities of tube bundles and an array of graphitic carbon aerogel particles connected in parallel.

Figure 7:
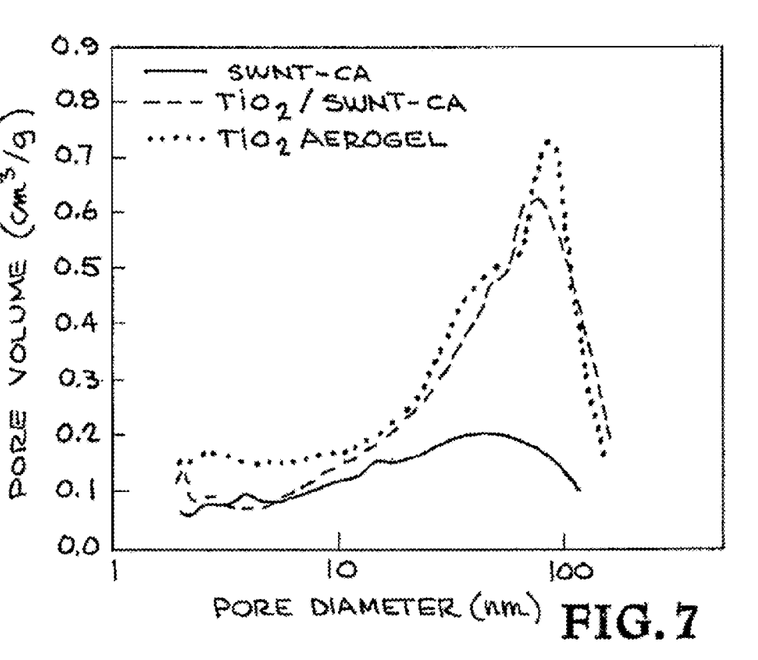
FIG. 7 plots the pore size distribution of the SWNT-CA, $TiO_2$/SWNT-CA, and pristine $TiO_2$ aerogel.

To demonstrate how the SWNT-CAs could serve as conductive scaffolds to make a wide range of conductive composites, SWNT-CAs were infiltrated with insulating aerogels and polymers to form composites. The composites were made by simply immersing the scaffold in the precursor sol or resin under vacuum prior to curing. After curing, supercritical extraction was used to yield the aerogel composites. Table 1 gives the CNT content, density, BET surface area, and electrical conductivity of SWNT-CA scaffolds and various composites made with the SWNT-CA scaffolds. FIG. 6 shows SEM images of the composites and FIG. 7 plots the pore size distribution of the SWNT-CA, TiO$_2$/SWNT-CA, and pristine TiO$_2$ aerogel. Table 1 shows that, in the case of the aerogel composites (TiO$_2$ and SiO$_2$), the high surface area and electrical conductivity of the SWNT-CA is not adversely affected by the infiltration of the insulating material. Though, based on the SEM images (FIGS. 6A-6B), the oxide aerogels appear to simply coat the SWNT-CA scaffold, the increased surface area suggests that the pore morphology of the oxide aerogels dominate. This is confirmed in the TiO$_2$ case via the pore size distribution (FIG. 7). FIG. 7 shows that the pore size distribution of the TiO$_2$/SWNT-CA is much closer to that of pristine TiO$_2$ aerogel instead of the SWNT-CA. Similar observations were made with the SiO$_2$/SWNT-CA. Thus, with the oxide aerogel composites, the high conductivity of the SWNT-CA is maintained exhibiting the pore morphology of the oxide aerogel.

TABLE 1

| Material | CNT, vol % (wt %) | Density, g/cm$^3$ | $S_{BET, m^{2/g}}$ | Sem$^{-1}$ |
|---|---|---|---|---|
| SWNT-CA-1 | 0.5 (30) | 0.030 | 184 | 0.77 |
| SWNT-CA-2 | 1 (55) | 0.028 | 162 | 1.12 |
| TiO$_2$/SWNT-CA-1 | 0.5 (8) | 0.082 | 203 | 0.72 |
| SiO$_2$/SWNT-CA-2 | 1 (16) | 0.080 | 652 | 1.00 |
| Epoxy/SWNT-CA-2 | 1 (1.5) | 1.120 | NA | 1.01 |

In the case of the polymer composite, Table 1 shows that the electrical conductivity of the SWNT-CA is maintained even in a fully dense insulating matrix. Little to no change in the conductivity indicates that the conductive scaffold is intact. SEM images of the epoxy/SWNT-CA (FIGS. 6C-6D) confirm that the conductive network is intact and the SWNTs are homogenously distributed throughout the polymer matrix. The conductivity of this material, to our knowledge, represents the highest reported conductivity (I Scm$^{-1}$) at this CNT loading level (1.5 wt % or I vol %) for an epoxy composite. The properties of the aerogel and polymer composites suggest that the SWNT-CA would serve as an excellent foundation for the development of a wide range of conductive composites.

The largest improvements in electrical conductivity were observed in DWNT-CAs with 8 wt % (1.3 vol %) DWNTs, showing a twofold increase in conductivity. To verify that these enhancements were attributable to the incorporated DWNTs and not the SDBS surfactant, we also measured the electrical conductivity of reference CA materials that were prepared with SDBS and without the DWNTs. While the data for these materials show modest improvements in conductivity relative to the pristine CA, the effect is small relative to the overall enhancements seen in the DWNT-CA composites. Therefore, these improvements can be attributed to the incorporation of DWNTs into the CA framework.

Figure 8A:
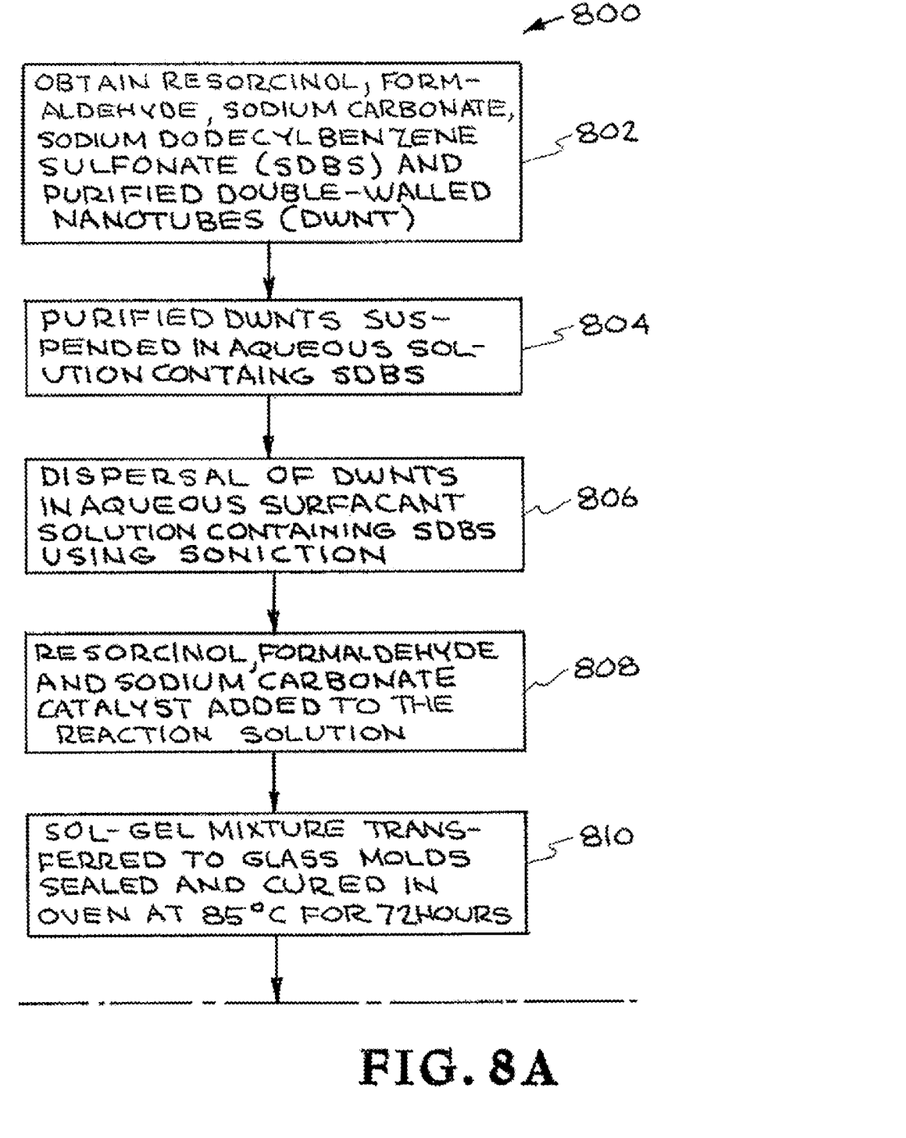
FIGS. 8A-8B illustrates one embodiment of a method of making a mechanically robust, electrically conductive ultralow-density carbon nanotube-based aerogel.
Figure 8B:
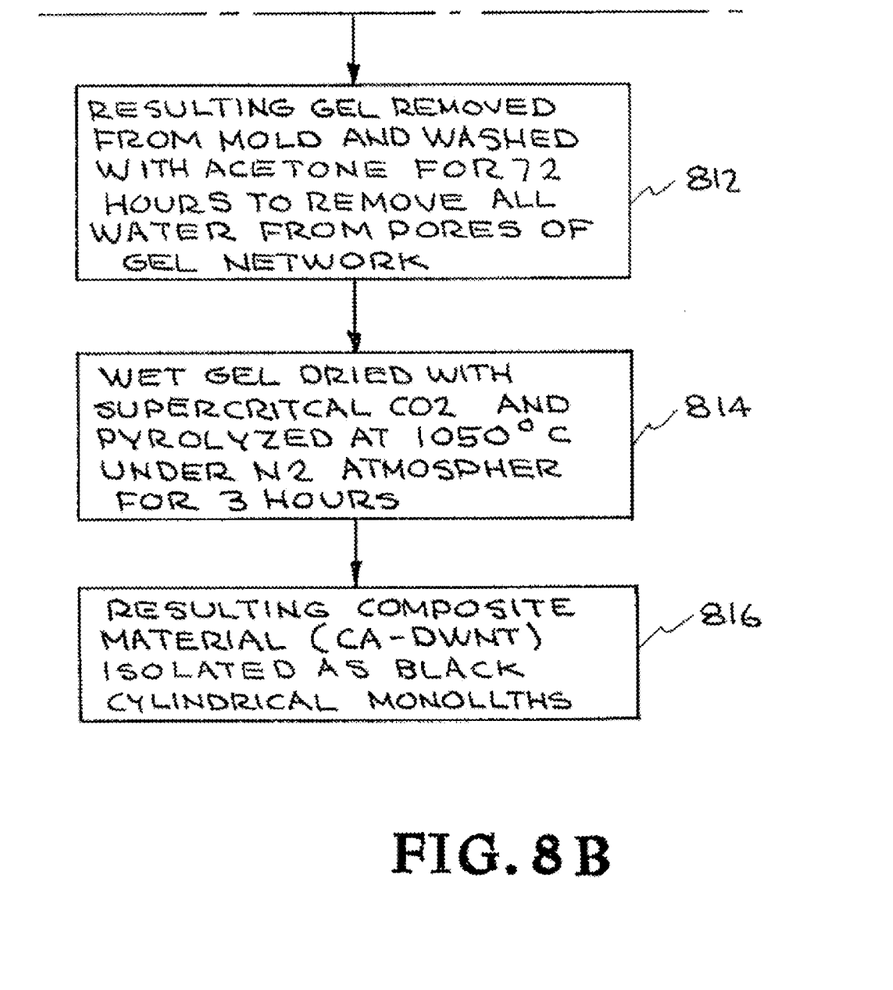

Referring again to the drawings and in particular to FIGS. 8A and 8B, one embodiment of a method of making a mechanically robust, electrically conductive ultralow-density carbon nanotube-based aerogel is illustrated. The method is designated generally by the reference numeral 800. The method 800 includes steps 802-816.

Step 802—Obtain: Resorcinol, form-aldehyde, sodium carbonate, sodium-dodecylbenzene sulfunate (SDBS) and purified double-walled nanotubes (DWNT).

Step 804—Purified DWNTS suspended in aqueous solution containing SDBS.

Step 806—Dispersal of DWNTS in aqueous surfactant solution containing SDBS using sonication.

Step 808—Resorcinol, formaldehyde and sodium carbonate catalyst added to reaction solution.

Step 810—Sol-gel mixture transferred to glass mods, sealed and cured in oven at 85° C. for 72 hours.

Step 812—Resulting gel removed from mold and washed with acetone for 72 hours to remove all water from pores of gel network.

Step 814—Wet gel dried with supercritical CO2 and pyrolyzed at 1050° C. under N2 atmosphere for 3 hours.

Step 816—Resulting composite material (CA-DWNT) isolated as black cylindrical monoliths.

Figure 9A:
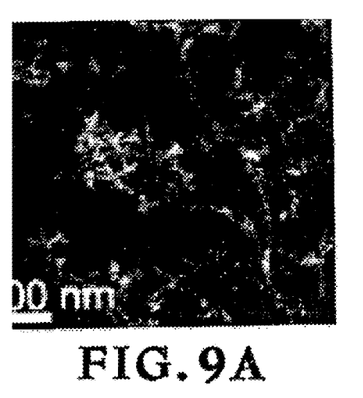
FIGS. 9A-9D are electron microscope images of the aerogel.
Figure 9B:
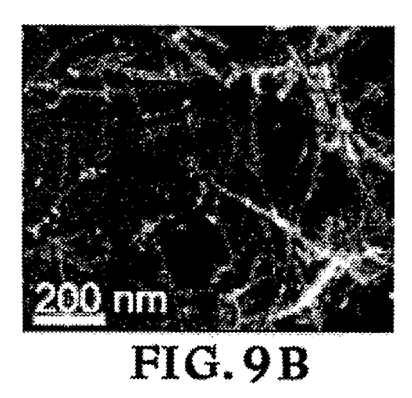
Figure 9C:
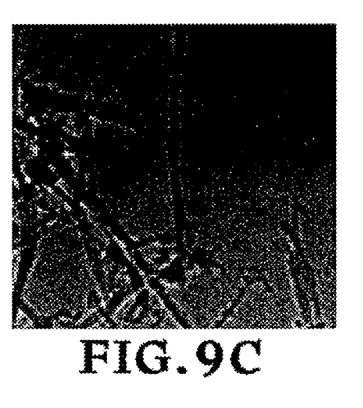
Figure 9D:
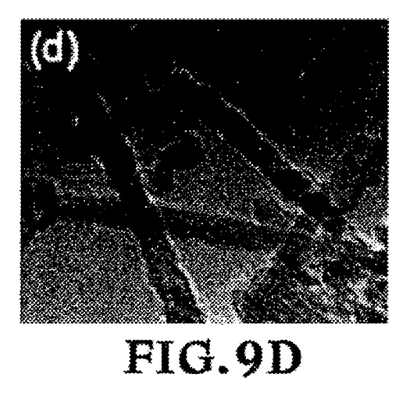

Referring to the FIGS. 9A-9D electron microscope images show one embodiment of an aerogel of the present invention. FIGS. 9A and 9B are electron microscope images at 200 nm. FIG. 9C is an electron microscope images at 100 nm. FIG. 9D is an electron microscope images at 20 nm. The ligaments are the nanotubes and the coating on the nanotubes are the carbon nanoparticles that serve as the binder holding the nanotubes together.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A device comprising a porous carbon aerogel or composite thereof as an energy storage material, catalyst support, sensor or adsorbent, wherein the porous carbon aerogel comprises a network of interconnected struts comprising carbon nanotube bundles covalently crosslinked by graphitic carbon nanoparticles, wherein the carbon nanotubes account for 5 to 95 wt. % of the aerogel and the graphitic carbon nanoparticles account for 5 to 95 wt. % of the aerogel, and wherein the aerogel has an electrical conductivity of at least 10 S/m and is capable of withstanding strains of more than 10% before fracture.

2. The device of claim 1, wherein the carbon nanotubes are single-wall carbon nanotubes.

3. The device of claim 1, wherein the carbon nanotubes are multi-wall carbon nanotubes.

4. The device of claim 1, wherein the aerogel comprises ligaments and a coating on the ligaments and wherein the ligaments are the carbon nanotubes and wherein the coating on the ligaments are carbon nanoparticles that serve as carbon binders holding the carbon nanotubes together.

5. The device of claim 1, wherein the aerogel comprises at least 20% by weight of carbon nanotubes.

6. The device of claim 1, wherein the aerogel comprises at least 30% by weight of carbon nanotubes.

7. The device of claim 1, wherein the aerogel comprises at least 55% by weight of carbon nanotubes.

8. The device of claim 1, wherein the aerogel consists essentially of carbon nanotube bundles covalently crosslinked by graphitic carbon nanoparticles.

9. The device of claim 1, comprising a composite which comprises the aerogel infiltrated with a polymer.

10. The device of claim 1, comprising a composite which comprises the aerogel infiltrated with an insulating polymer while retaining an electrical conductivity of at least 10 S/m.

11. The device of claim 1, comprising a composite which comprises the aerogel infiltrated with a metal oxide.

12. The device of claim 1, comprising a composite which comprises the aerogel infiltrated with an insulating metal oxide while retaining an electrical conductivity of at least 10 S/m.

13. The device of claim 1, comprising a composite which comprises the aerogel infiltrated with $TiO_2$ or $SiO_2$.

14. The device of claim 1, wherein the device is a rechargeable battery or a supercapacitor.

15. The device of claim 1, wherein the device comprises the porous carbon aerogel as an energy storage material.

16. The device of claim 1, wherein the device comprises the porous carbon aerogel as a catalyst support.

17. The device of claim 1, wherein the device comprises the porous carbon aerogel as a sensor.

18. The device of claim 1, wherein the device comprises the porous carbon aerogel as an adsorbent.

19. An electrode comprising a porous carbon aerogel or composite thereof, wherein the porous carbon aerogel comprises a network of interconnected struts comprising carbon nanotube bundles covalently crosslinked by graphitic carbon nanoparticles, wherein the carbon nanotubes account for 5 to 95 wt. % of the aerogel and the graphitic carbon nanoparticles account for 5 to 95 wt. % of the aerogel, and wherein the aerogel has an electrical conductivity of at least 10 S/m and is capable of withstanding strains of more than 10% before fracture.

20. A rechargeable battery or supercapacitor comprising the electrode of claim 19.

* * * * *